Aug. 15, 1933.  F. L. HUNTER, JR  1,922,244
ELECTRODE AND METHOD OF MAKING THE SAME
Filed Sept. 13, 1930
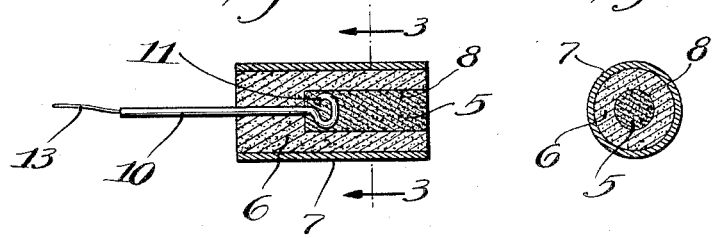
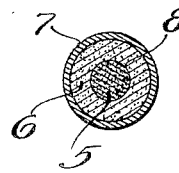
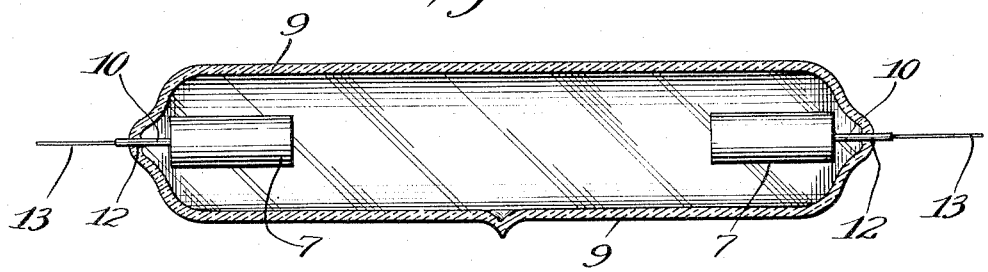
Inventor:
Frederick L. Hunter Jr.
By Williams, Bradbury, McCalb,
& Hinkle
Attys.

Patented Aug. 15, 1933

1,922,244

UNITED STATES PATENT OFFICE 1,922,244

ELECTRODE AND METHOD OF MAKING THE SAME

Frederick L. Hunter, Jr., Lake Bluff, Ill., assignor to Fansteel Products Company, Inc., North Chicago, Ill., a Corporation of New York Application September 13, 1930
Serial No. 481,640

4 Claims. (Cl. 176—126)

This invention relates in general to gaseous conduction apparatus or vacuum tubes and has more particular reference to electrodes for use in such apparatus or tubes.

In the manufacture of gaseous conduction apparatus or tubes, various precautions are required in order to completely degasify the tubes and the electrodes and to completely exhaust such tubes before sealing, because the presence of very small amounts of foreign gases or vapors as impurities greatly increases the resistance of the tube during its operation and causes color changes in the light from the tube and impairs its luminous efficiency.

Notwithstanding these precautions the phenomenon known as "sputtering" has heretofore presented a problem, the solution of which has been the prime desideratum of exhaustive experimental research.

Irrespective of the causes of sputtering, its effects include the gradual depositing of the electrode material on the walls of the tube, thereby forming a thin coating of electrode material on the tube walls, which occludes and imprisons the gas which acts as a condenser plate with nearby grounded objects and which causes heating of the tube walls. This occlusion of the gas diminishes the gas pressure within the tube and causes the discharge between the electrodes to become more feeble or to cease altogether.

A primary object of the present invention is the production and provision of an improved electrode which will overcome the foregoing defects.

An important object of the invention is the provision of a non-sputtering electrode for gaseous conduction devices or vacuum tubes.

A further important object of this invention is the provision of a composite electrode and a container therefor which has a high thermal capacity and which is provided with thermal insulation arranged about said container.

Another important object of the invention is the provision of an efficient non-sputtering electrode which will have a greater life period in gaseous conduction devices such as neon signs than those heretofore so used.

Other objects and advantages of my present invention will become apparent from the following description.

Referring to the drawing:

Fig. 1 is a longitudinal section through an electrode embodying the features of the invention;

Fig. 2 is longitudinal section through a gaseous conduction device or vacuum tube equipped with electrodes identical to that shown in Fig. 1; and Fig. 3 is a section taken substantially on the line 3—3 of Fig. 1.

It is generally known that electrodes of gaseous conduction devices or vacuum tubes such as neon signs sputter considerably in operation. Such sputtering of the electrodes decreases the life of the device in which the electrodes are operated.

The present invention, therefore, briefly contemplates the production and provision of an improved electrode for gaseous conduction devices comprising a powdered material or compound adapted to produce a metal of high electron emissivity when heated. This material or compound is pocketed in a body or container of high thermal capacity. A bright metal sleeve or sheath embraces the container to provide thermal insulation whereby to efficiently utilize the heat generated in operating a gaseous conduction device equipped with such electrodes.

For the accomplishment of the foregoing objects I provide a powdered material or compound 5 adapted to produce a metal of high electron emissivity when heated. This material or compound 5 is preferably pocketed in a cup-shaped container 6 of high thermal capacity. The container 6 is surrounded or embraced by a bright metal sleeve 7 for providing thermal insulation to maintain the interior of the container 6 at a greater temperature than it would otherwise be maintained.

The powdered material or compound 5 preferably comprises a salt or an oxide of barium, strontium, cerium, thorium or any suitable mixture of such compounds of alkali metals or earths with the proper amount of magnesium, aluminum or carbon to reduce the oxide when the mixture is heated. Preferably, however, powders of barium oxide and sufficient powdered aluminum to reduce this oxide are tamped in a pocket 8 of the cup-shaped container 6 as illustrated in Fig. 1.

During the process of arcing the tube to drive out the occluded gases the electrodes are heated to a temperature sufficient to cause a chemical reaction between the alkali compound and the reducing agent with the consequent formation of the alkali metal or earth which is distributed throughout the semi-porous mass formed in the pocket 8 of the electrode so that the electron emission from all portions of the reduced metal will be effective in the discharge.

While the container 6 may be formed of any substance having a high thermal capacity and capable of withstanding the heat developed during the arcing or flashing of the electrode, such as nickel, iron, or a refractory metal carbide with a suitable bonding substance, graphite is preferably employed because it is important that the temperature of the mixture 5 in the pocket 8 is not raised too rapidly. A very rapid rise in the temperature of the compound in the pocket 8 may cause the occluded gases and the gases of the reaction to blow the powdered material out of the cup and to thereby render the electrode useless.

The metal sleeve or sheath 7 may be of any suitable metal having a bright surface, but tantalum or columbium are preferred because of their heat insulating qualities and because of the scavenging action of these metals during the heating and degasifying of the electrodes when mounted in a gaseous conduction device or vacuum tube 9.

Another desirable feature obtained by the use of tantalum in the construction of the sleeves 7 resides in the fact that tantalum or columbium provides a very good electrode. This tantalum sleeve 7 and the container 6 may therefore serve as an electrode if the emitting mixture or compound is used up during the life of the tube or fails for any other reason to operate as an electrode. In effect, therefore, the novel electrode of the invention comprises a body including the container 6 and the sleeve 7 providing an auxiliary electrode for an emitting mixture or compound 5 carried thereby. It will, of course, be understood that the electrode may be considered as a body including the container 6 and the emitting mixture or compound 5, surrounded or embraced by the sleeve 7.

A suitable conductor 10, preferably of tantalum having an end 11 formed as a loop or ring imbedded in the material or compound 5 and extending through the container 6, is sealed as at 12 in Fig. 2 where it passes through the end of the vacuum tube 9. This conductor 10 constitutes a lead-in wire and may be secured to a suitable conductor 13 by means of which the necessary potential is supplied to the electrodes for the operation of the tube. When electrodes are made in accordance with the above described process, the entire discharge is carried by the emitting portions 5 of the electrodes. Such tubes have been found to have a prolonged life because of the non-sputtering property of the electrode and have a very low electrode drop of potential.

It will be understood by those skilled in the art that the specific form of my invention as described may be modified without departing from the spirit thereof, and I desire to avail myself of such modifications as come within the scope of the appended claims.

I claim as my invention:

1. An electrode for gaseous conduction devices comprising a powdered mixture of barium oxide and a reducing agent therefor, a container carrying said mixture, a tantalum sleeve embracing said container and providing thermal insulation for said mixture and a lead-in conductor imbedded in said mixture and for supporting said electrode.

2. An electrode for gaseous conduction apparatus comprising an emitting portion including an alkali earth compound and a reducing agent, a graphite container for said emitting portion and a refractory metal sleeve arranged about said container as thermal insulation for said emitting portion.

3. An electrode including an alkali compound producing mixture in combination with an auxiliary electrode comprising a body of high thermal capacity having a recess therein carrying said electrode mixture, and a bright metal sleeve embracing said body.

4. An electrode including an alkali compound producing mixture in combination with an auxiliary electrode comprising a graphite container for said electrode mixture and a bright tantalum sleeve embracing said container.

FREDERICK L. HUNTER, Jr.